United States Patent
Ivanov

(10) Patent No.: US 9,513,889 B2
(45) Date of Patent: Dec. 6, 2016

(54) SYSTEM AND METHOD OF AUTOMATING INSTALLATION OF APPLICATIONS

(71) Applicant: Kaspersky Lab ZAO, Moscow (RU)

(72) Inventor: Anton M. Ivanov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 197 days.

(21) Appl. No.: 14/197,708

(22) Filed: Mar. 5, 2014

(65) Prior Publication Data

US 2015/0186126 A1    Jul. 2, 2015

(30) Foreign Application Priority Data

Dec. 27, 2013 (RU) ................................ 2013158139

(51) Int. Cl.
  *G06F 9/445* (2006.01)
  *G06F 3/0481* (2013.01)

(52) U.S. Cl.
  CPC ............... *G06F 8/61* (2013.01); *G06F 3/0481* (2013.01); *G06F 9/44505* (2013.01)

(58) Field of Classification Search
  None
  See application file for complete search history.

(56) References Cited

U.S. PATENT DOCUMENTS

| | | | | |
|---|---|---|---|---|
| 5,786,993 | A | * | 7/1998 | Frutiger et al. ................ 700/83 |
| 6,854,089 | B1 | * | 2/2005 | Santee et al. ................ 715/783 |
| 7,587,715 | B1 | * | 9/2009 | Barrett et al. ............... 717/176 |
| 8,286,160 | B2 | | 10/2012 | Asai |
| 8,307,358 | B1 | * | 11/2012 | Koryakina et al. .......... 717/174 |
| 8,490,079 | B2 | | 7/2013 | Sugai |
| 2002/0122065 | A1 | * | 9/2002 | Segal et al. .................. 345/783 |
| 2003/0005413 | A1 | * | 1/2003 | Beer .................. G06F 11/3664 717/125 |
| 2003/0018963 | A1 | * | 1/2003 | Ashworth et al. ........... 717/175 |
| 2004/0123284 | A1 | * | 6/2004 | Bryant et al. ................ 717/174 |
| 2005/0081166 | A1 | * | 4/2005 | Stokke ................ G06F 9/4446 715/851 |
| 2006/0010345 | A1 | * | 1/2006 | Schnoebelen ....... G06F 11/2294 714/25 |
| 2007/0263083 | A1 | | 11/2007 | Tamai et al. |
| 2008/0098387 | A1 | * | 4/2008 | Lo et al. ....................... 717/174 |
| 2008/0282160 | A1 | * | 11/2008 | Tonnison et al. ............ 715/704 |
| 2009/0265586 | A1 | * | 10/2009 | Fitoussi et al. ................ 714/48 |
| 2011/0004872 | A1 | * | 1/2011 | Eromenko et al. .......... 717/174 |
| 2012/0131467 | A1 | | 5/2012 | Kemmler et al. |
| 2012/0246630 | A1 | * | 9/2012 | Kuzins et al. ................ 717/169 |
| 2013/0019170 | A1 | * | 1/2013 | Mounty et al. ............... 715/704 |
| 2013/0132937 | A1 | | 5/2013 | Sung et al. |
| 2014/0259008 | A1 | * | 9/2014 | Bhattiprolu et al. ......... 717/174 |
| 2014/0282488 | A1 | * | 9/2014 | Tagliabue .................... 717/174 |

(Continued)

FOREIGN PATENT DOCUMENTS

| | | |
|---|---|---|
| EP | 1594055 A1 | 11/2005 |
| RU | 2443012 | 10/2009 |

*Primary Examiner* — Jue Louie
(74) *Attorney, Agent, or Firm* — Arent Fox LLP; Michael Fainberg

(57) ABSTRACT

Disclosed are systems, methods and computer program products for automating installation of applications. In one aspect, the system launches an application installer of a software application; identifies control elements in an active window of the application installer, wherein the control elements include at least user interface (UI) elements responsible for transitioning the active window to another window of the application installer; transitions to other windows of the application installer and identifies control elements in all other windows of the application installer until the application is installed; generates an automatic installation rule for the application that automatically activates one or more windows of the application installer and one or more control elements of said window to install the application without a participation of a user.

17 Claims, 6 Drawing Sheets

(56) References Cited

U.S. PATENT DOCUMENTS

2014/0282975 A1* 9/2014 Linszner .......................... 726/7

2015/0082207 A1* 3/2015 Prasad ...................... G06F 8/34
715/762

* cited by examiner

SYSTEM AND METHOD OF AUTOMATING INSTALLATION OF APPLICATIONS

CROSS-REFERENCE TO RELATED APPLICATIONS

This application claims benefit of priority under 35 U.S.C. 119(a)-(d) to a Russian Application No. 2013158139 filed on Dec. 27, 2013, which is incorporated by reference herein.

TECHNICAL FILED

The disclosure relates generally to the field of software, and more specifically, to a system and method for automating installation of applications.

BACKGROUND

At present, the problem of installing software (SW) on the computers of users may be solved in several ways. The first, for example, may be a manual installation of each distributive of software, but it has a number of drawbacks, one of which is the need for administrator rights, the possession of sufficient skill by the user, and a certain amount of time for the installation. In the context of a corporate network, such duties are performed by an administrator, which makes the manual approach to SW installation unacceptable given a large number of computers.

Other ways of installing SW may include the use of an image of the operating system with already installed applications, or the installing of the SW in automatic mode. The latter technique requires either an option in the application being installed in a silent or quiet mode, when the participation of the user is not required, or the use of special programs which dictate the actions of the user for their replication in the future. For example, the use of the program Auto Clicker Typer may make it possible to specify the pressing of certain buttons in a window (such as "Next >" or "Finish").

However, in a number of cases the installation of SW in silent mode may not be available or it may be necessary during the installation to perform a number of actions that may involve the software and hardware of the computer (such as the required presence of a preinstalled .NET Framework package or a verification of the hardware support of the application functions). Yet another example of actions on the part of the user is the mandatory consent to the terms of the user agreement (End User License Agreement, or EULA). For example, there may be an approach to the installing of SW that takes into account errors as they arise (such as due to absence of consent to the EULA) with subsequent restarting of the installation process to work around them.

Although there may be a rather large number of tools for automating the installation of SW, they are all more or less based on the analysis of already existing applications and methods for their installation. When a new SW comes out, or installation procedure is changed, human involvement is needed to correct the automatic installation procedure. Thus, there is a need to create a solution that is able to carry out an automatic installation of any given SW without human involvement, regardless of the installation conditions.

Analysis of the related art leads to the conclusion that it is inefficient and in some cases impossible to use the prior technologies, whose drawbacks are remedied by the present invention, specifically, by a method of automating the process of installation of an application.

SUMMARY

The technical result of the present invention consists in making possible an automatic installation of an application by using an installation rule for an application installer, which is created with the aid of a method of creation of an installation rule, wherein the installation rule includes a sequence of activation of control elements during the working of the installer for a successful completion of the installation, According to an aspect, a method for automating installation of applications includes launching, by a processor, an application installer of a software application; identifying control elements in an active window of the application installer, wherein the control elements include at least user interface (UI) elements responsible for transitioning the active window to another window of the application installer; transitioning to other windows of the application installer and identifying control elements in all other windows of the application installer until the application is installed; and generating an automatic installation rule for the application that automatically activates one or more windows of the application installer and one or more control elements of said window to install the application without a participation of a user.

According to another aspect, a system for automating installation of applications includes a processor configured to: launch an application installer of a software application; identify control elements in an active window of the application installer, wherein the control elements include at least user interface (UI) elements responsible for transitioning the active window to another window of the application installer; transition to other windows of the application installer and identify control elements in all other windows of the application installer until the application is installed; and generate an automatic installation rule for the application that automatically activates one or more windows of the application installer and one or more control elements of said window to install the application without a participation of a user.

According to yet another aspect, a computer program product stored on a non-transitory computer readable medium, for automating installation of applications, includes computer executable instructions for; launching an application installer of a software application; identifying control elements in an active window of the application installer, wherein the control elements include at least user interface (UI) elements responsible for transitioning the active window to another window of the application installer; transitioning to other windows of the application installer and identify control elements in all other windows of the application installer until the application is installed; generating an automatic installation rule for the application that automatically activates one or more windows of the application installer and one or more control elements of said window to install the application without a participation of a user.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Example aspects are described herein in the context of a system, method and computer program product for automating installation of applications. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 2:
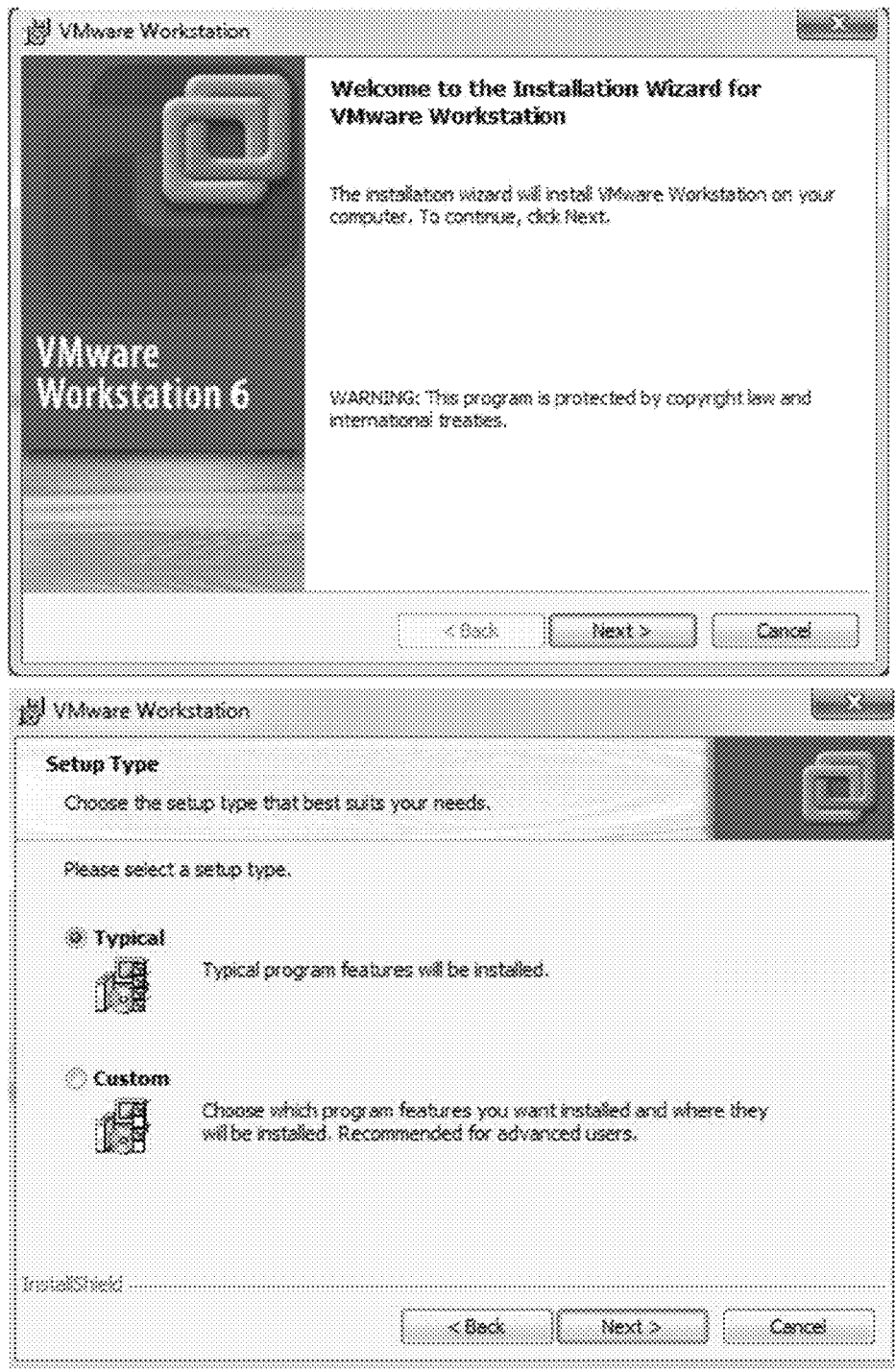
FIG. 2 illustrates examples of VMware workstation SW installer screens according to aspects of the present invention.

According to an aspect of the invention, an installation package (hereinafter, simply package or installer) may generally contain, besides the software distribution package, a set of certain metadata that may include the complete name of the package, the version number, a description of the package, the name of the developer, a check sum, and other information. The installing of the SW in the operating system (OS) is generally done by a package control system (for example, in Unix or Mac OS systems) or a separate component of the operating system (Windows Installer for the Windows family of systems). During the installing of the SW, user actions may be required relating to the selection of SW components, consenting to the user agreement (EULA), and others. FIG. 2 shows examples of the SW installer screens of the VMware workstation according to aspects of the present invention. As shown, the active interface elements (hereinafter simply elements) of the user-accessible windows may be the Buttons "Next >", "Cancel", "<Back", as well as elements of RadioButton type. Windows for other SW installers may also contain elements of other types, such as CheckBox, ComboBox, ListBox, image, Label, TextBox, TabControl, Grid, StackPanel and others. It should be noted that elements may be active (the user can interact with them) or inactive (for example, the "Next >" button may be blocked until the user consents to the terms of the user agreement). In turn, one may also identify among the elements control elements responsible for the transitioning to other windows or the unblocking of other elements in the window.

Figure 3:
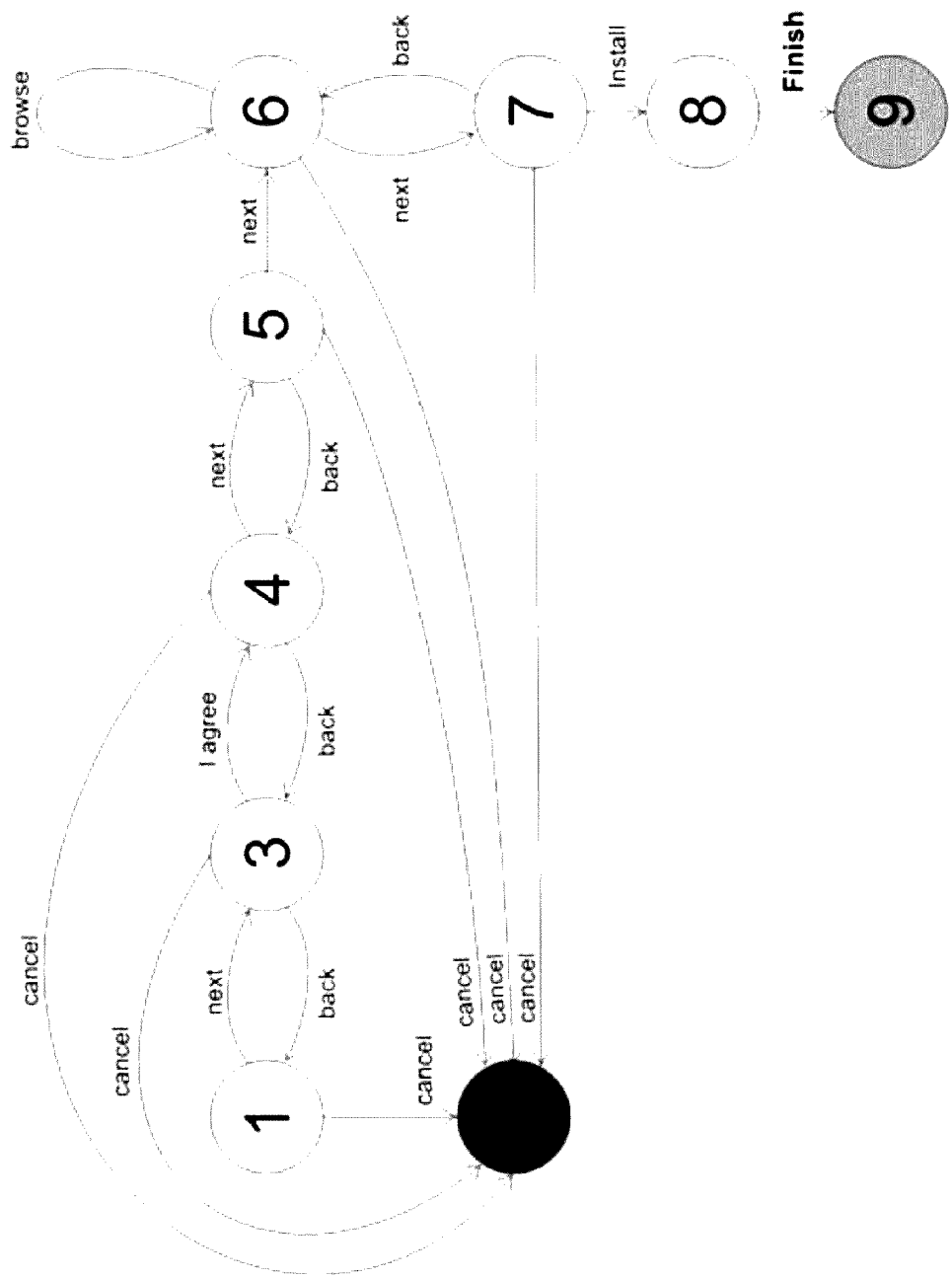
FIG. 3 illustrates a flow diagram of example moves between windows of the interface of one of the installers according to aspects of the present invention.

By selecting (e.g., activating by clicking with a mouse button) different elements of the installer interface, the user may select the necessary SW options, transition between different stages of the installation, terminate the installation, and so on. FIG. 3 shows a flow diagram of example moves between the interface windows of one of the installers according to aspects of the present invention. The numbered circles show the windows of the installer (as a rule, the windows also reflect certain stages in the SW installation), and the arrows indicating corresponding buttons show the moves between windows. For example, pressing the button "I agree" may result in a transition between windows 3 and 4, while pressing the button "Cancel" in windows 1, 5, 6, 7 may result in a termination of the installation process in window 2. As shown, the sequence of selecting the series of buttons "next", "I agree", "Install" may result in a successful installation of the SW on the computer. In the context of the present invention, the sequence of selecting buttons (or selecting other interface elements) that leads to a successful installation of the SW will be called an installation rule.

The present invention may use installation rules for different installers for the purpose of their automatic installation without user involvement.

Figure 1:
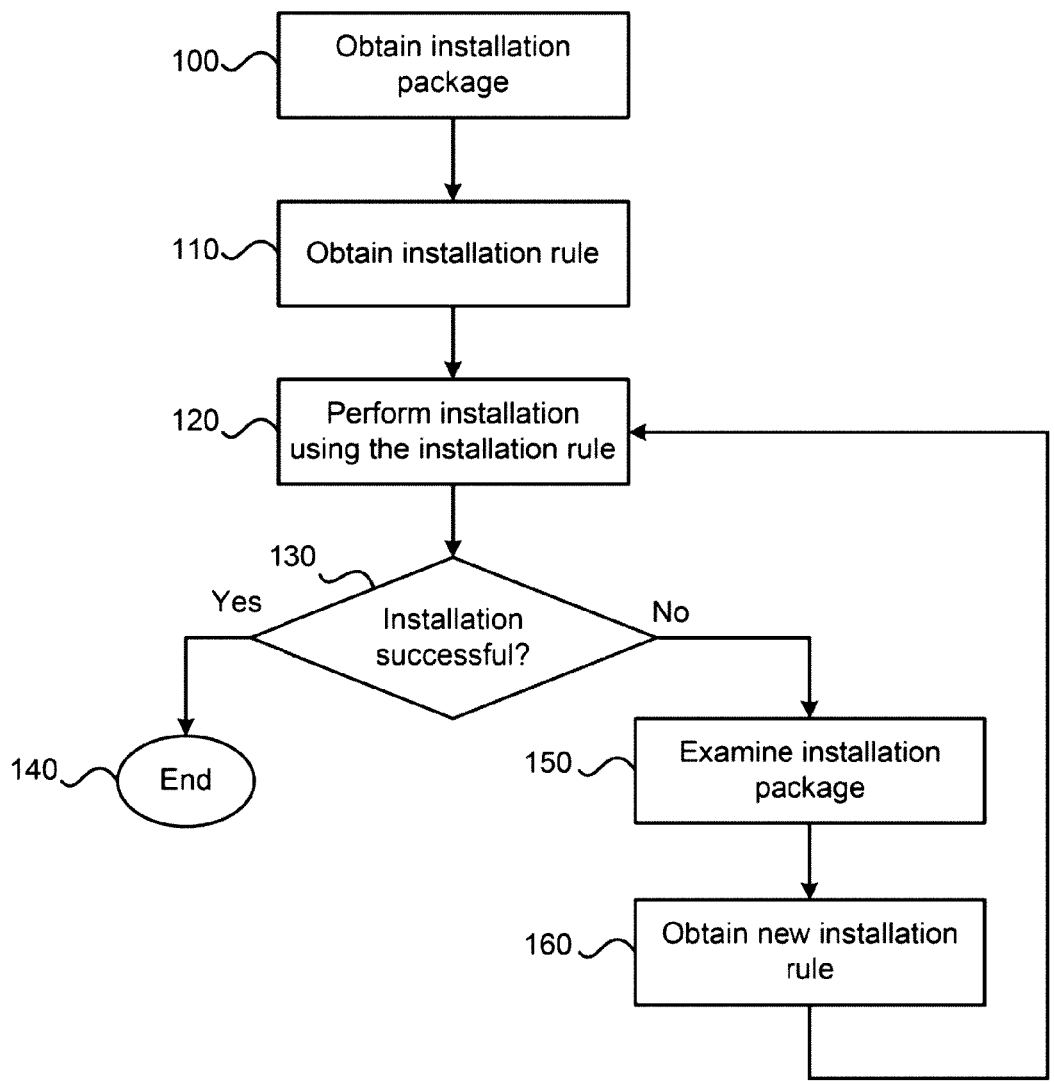
FIG. 1 illustrates a flow diagram of an example method for automating installation of applications according to aspects of the present invention.

FIG. 1 illustrates a flow diagram of an example method for automating installation of applications according to aspects of the present invention. In step 100, a SW installation package may arrive (e.g., may be downloaded from a remote server or from an installation CD) at the user's computer and may need to be installed. In step 110, the installation rule for the installation package may be obtained. The installation rule may include the activation sequence for the control elements (such as the selection of a series of buttons) during the working of the installer for a successful completion of the installation. The installation rule may either apply to a specific installer (i.e., it will be a rigidly specified set of buttons to select) or it may be rather general (for example, it will be enough for many installers to press the "Next >" button several times). In step 120, the SW installation may be performed using the installation rule, after which in step 130 there may be a check of whether the installation was successful. Examples of a successful installation may include, but not limited to one of more of the following conditions:

Presence of file and/or OS registry changes;
Addition of the application to the list Add/Remove Programs;
Appearance of an icon for starting the application on the desktop or in the quick start window;
Restarting of the computer;
Appearance of new services;
Installation of new drivers;
Starting of processes from new executable files;
Appearance of new plug-ins (for example, in Web browsers).

If the installation is found to be successful, the method may end in step 140. Otherwise, in step 150, an examination of the installer may be performed to carry out a successful installation by means of a new or amended installation rule. The examination of the installer is presented below. After the new installation rule is obtained in step 160, the method may return to step 120 for a repeat installation until the installation is done successfully.

Figure 4:
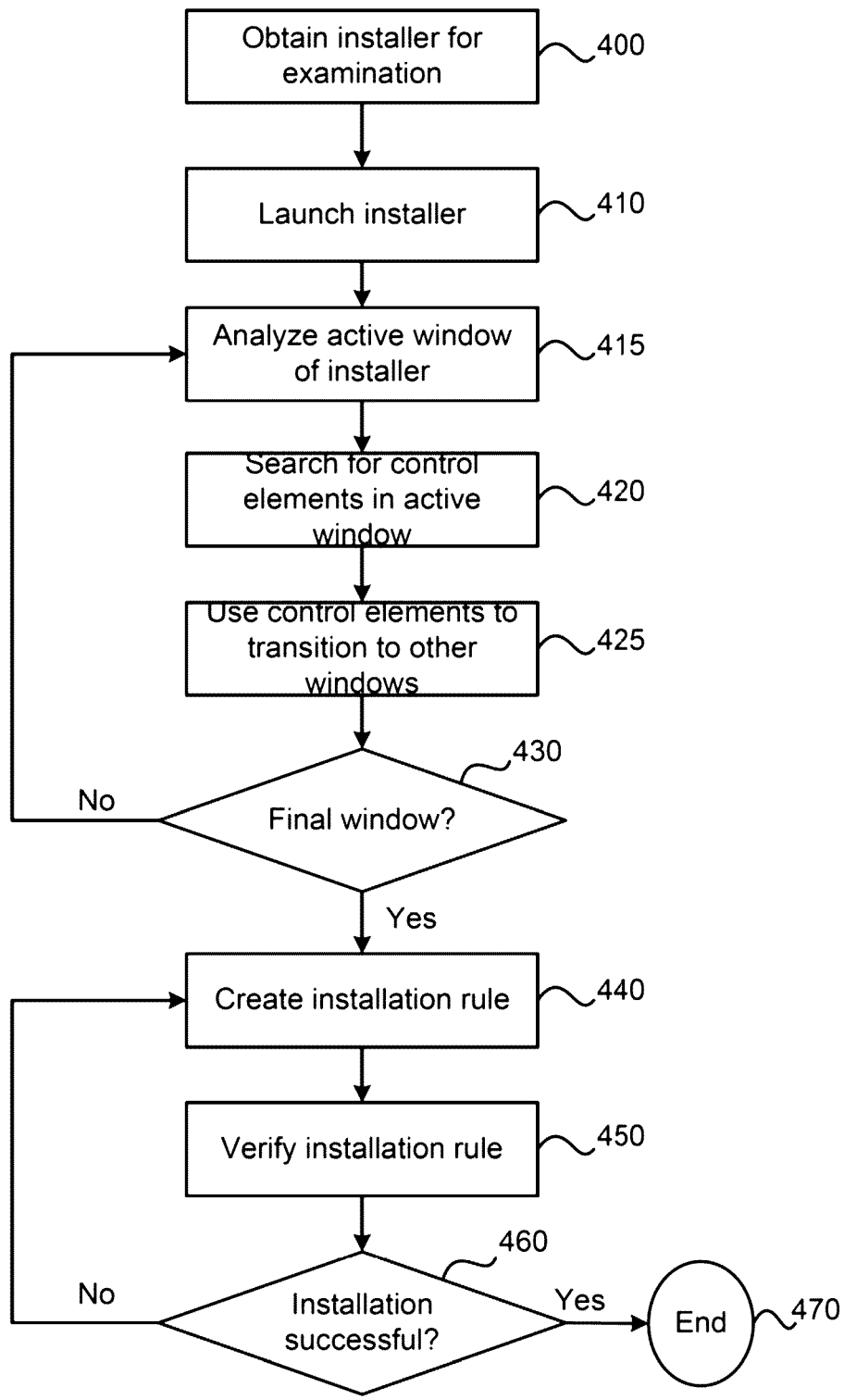
FIG. 4 illustrates a flow diagram of an example method of an analysis of installer windows in order to discover the control elements according to aspects of the present invention.

FIG. 4 illustrates a flow diagram of an example method for examination of the application installer according to aspects of the present invention. In step 400, the installer may be obtained for its examination, after which in step 410 the installer may be executed (e.g., initialized/started). The examination may be performed as a start-up either in a real or a virtual environment (e.g., a virtual machine, emulator). Next, in step 415, an analysis may be performed on the active window of the installer for the presence of active elements. In step 420, a search may be performed for control elements in the active window, i.e., those elements responsible for moving to other windows or unblocking other elements in the window (such as the element CheckBox, related to the acceptance of the license agreement, making active the "next" button, which allows the installation to continue). After the control elements have been determined, they may be used to transition to the other windows of the installer in step 425 (example shown in FIG. 3). In these windows, the process of discovering control elements may be repeated until it is discovered, in step 430, that all windows of the installer have been analyzed. After this, in step 440, the installation rule may be created.

An example of an installation rule written in xml format is given below:

```
<steps>
    <window>
        <caption> caption 1 </caption>
        <button>Next</button>
    </window>
    <window>
        <caption> caption 2 </caption>
        <button>I agree</button>
    </window>
    <window>
        <caption> caption 3 </caption>
        <button>Next</button>
    </window>
    <window>
        <caption> caption 4 </caption>
        <button>Next</button>
    </window>
    <window>
        <caption> caption 5 </caption>
        <button>Install</button>
    </window>
    <window>
        <caption> caption 6 </caption>
        <button>Finish</button>
    </window>
</steps>
```

Using these and similar rules, a user may select a true control element in dependence on the current window.

The following criteria may be used for creating an installation rule:
  A minimum route is selected on the chart from the starting to the ending window of the installer;
  The ending window of the installer is the window after which the file and possibly the register changes are determined in the OS (indicating a successful installation);
  The application is added to the list Add/Remove Programs;
  An icon appears for starting the application on the desktop or in the quick start window;
  Restarting of the computer;
  Appearance of new services;
  installation of new drivers;
  Starting of processes from new executable files.

After the installation rule is created in step 440, the rule may be verified in step 450. The verification may be done on the user's computer and a successful result may be any one of the conditions of a successful installation (listed above), as well as user feedback, which may occur in step 460, after which the method may end in step 470. Otherwise, the method again moves to step 440 to create a new (or amended) installation rule.

An amended variant of the installation rule may entail the making of changes to the sequence of selecting (activating) of the control elements in the windows of the installer. In one aspect, the flow diagram of moves (as shown in FIG. 3, for example) from the starting to the ending window may be analyzed until the installer window after which the previously known transition does not work is found. For example, a new control element (such as consent to an additional agreement) may have been added in the altered window and may need to be activated. Hence, activation of the new control element may be a necessary condition for the transition.

Possible difficulties in the creating of an installation rule may include the following situations:
  Localization. The names of the control elements may be different according to localization. The language of the installer may be selected during its starting or defined in accordance with local settings on the computer. To solve such a problem, one may use glossaries that reduce elements with different names to a single general form. For example, buttons with the names "Next >" and "Aanee >" may be saved as the "Next" button, indicating the functional of a transition to the following window. Another solution may be to use identifiers of elements in cases when the identifiers are identical for different localizations.
  Activation of certain elements by means of others. For example, the button "Next >" may be blocked until the user consents to the terms of the user agreement (generally this is an element of CheckBox type). One solution to this problem may be to try out all the active elements in the window one by one with their subsequent activation and tracking of the changes in status of the other elements. For example, after activating one element, a trial may be made of all the other elements of the window to track the change in their status. First and foremost, one may single out those elements which are known to control the transition to other windows or which finish the installation, such as the buttons "Next >", "Install", "Finish".
  Nonstandard control elements, such as images. In such a case, an identifier of the image that must be selected may be indicated in the rules, or even the coordinates for the selecting will be indicated.

The created installation rules may be formalized so that they may be used not only for a particular application, but also for a broad range of SW. For example, if the installation rule for one installer includes the pressing of 2 "Next >" buttons and one "Finish" button, while that for a second installer includes the pressing of 3 "Next >" buttons and one "Finish" button, the formalization may be as follows: press N "Next >" buttons and press the "Finish" button in the last window. Such rules can also be saved in xml format.

Figure 5:
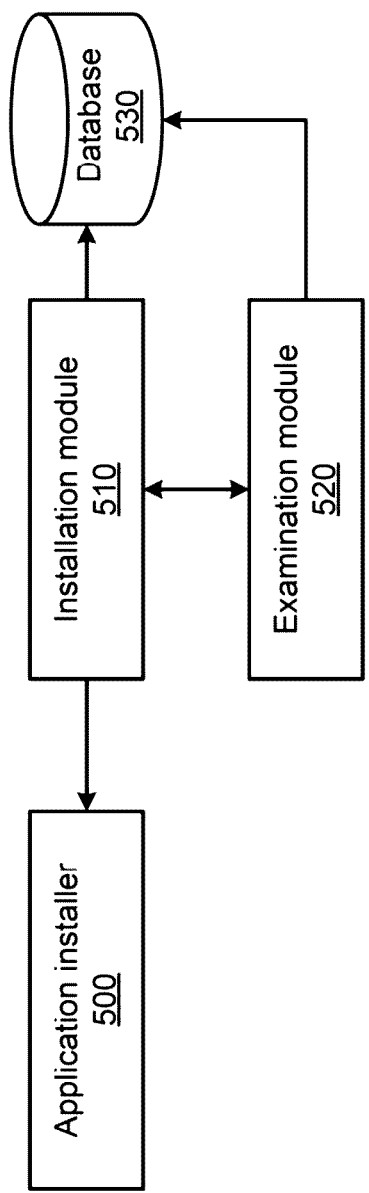
FIG. 5 illustrates a block diagram of an example system for automating installation of applications according to aspects of the present invention.

FIG. 5 illustrates a block diagram of an example system for automating installation of applications according to aspects of the present invention. As depicted, the system may include an application installer 500, installation module 510, examination module 520, and a database of installation rules. The installation module 510 may launch the application installer 500 of a software application. The installation module 510 may prompt the examination module 520 to examine an active window of the application installer 500 and identify control elements in the active window. The control elements may include, for example, user interface (UI) elements responsible for the transitioning of the current active window to another window of the application installer 500. The examination module 520 may identify the control elements. The examination module 520 may then transition to other windows of the application installer 500 using the control elements, and may continue to identify control elements in all other windows of the application installer 500 until the application is installed. The examination module 530 may then generate an automatic installation rule for the application. The installation rule may, for example, automatically activate one or more windows of the application installer 500 and one or more control elements of said window to install the application without a participation of a user. The examination module 510 may store the installation rule in the database 530.

Once the installation rule has been created and stored in the database 530, the installation module 510 may obtain the installation rule from the database 530 to facilitate installing the same or other applications via the application installer 500. For example, the installation rule may either apply to a specific application installer 500 that requires a strict selection sequence of control elements, or it may be rather general and require only the selection of the "Next >" button several times and thus applicable to many other applications. The installation module 510 may perform the installation of the application using the installation rule, and may check whether the installation was successful. If the installation is found to be unsuccessful, the installation module 510 may prompt the examination module 520 to analyze the active windows of the application installer 500 and generate a new or amended installation rule, which the examination module 520 may again store in the database 530. Upon completion of the analysis, the examination module 520 may signal the installation module 510 that it had completed the examination and had saved the new installation rule in the database 530. The installation module 510 may then carry out a successful installation by using the new or amended installation rule.

Figure 6:
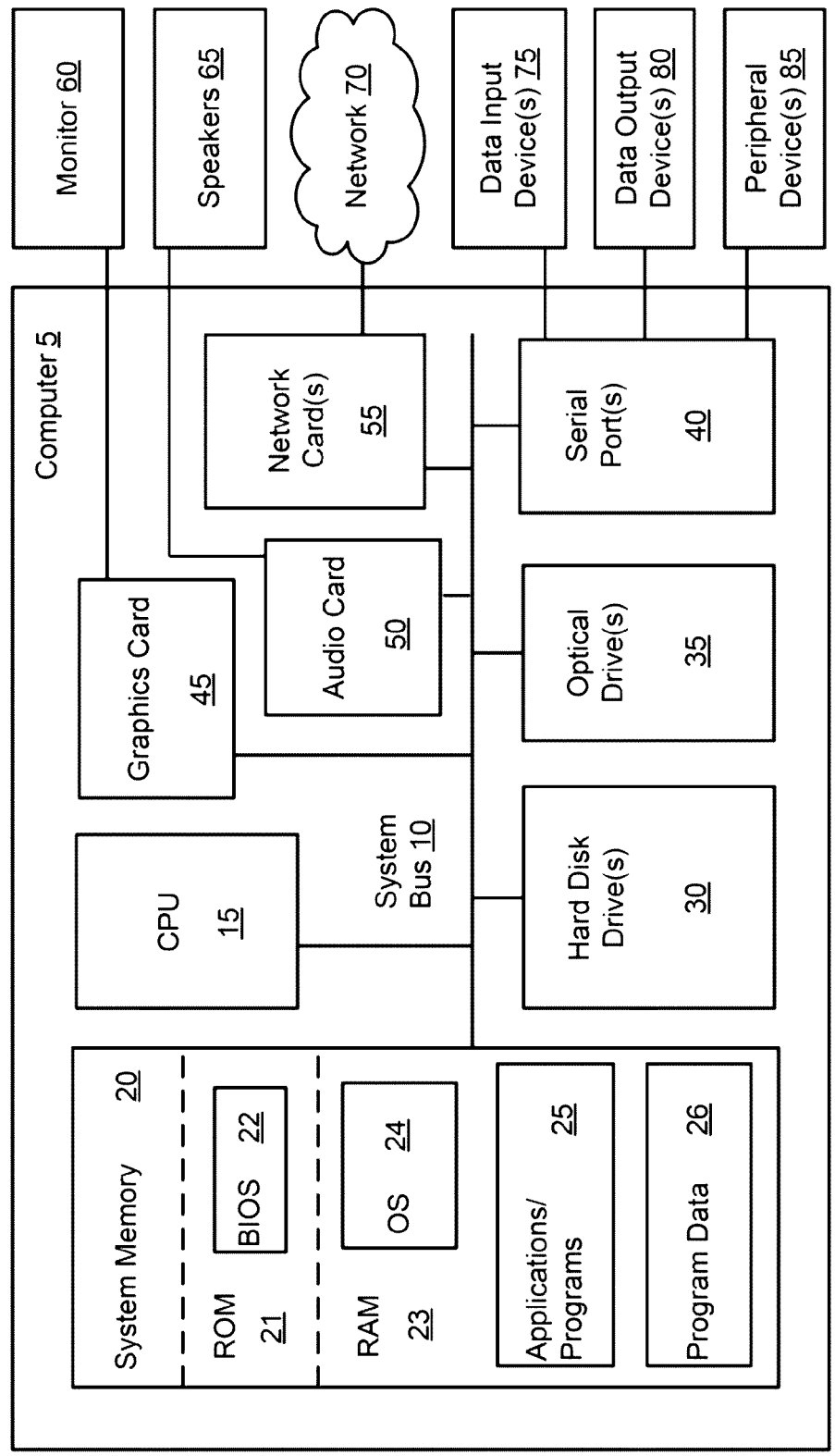
FIG. 6 illustrates a block diagram of an example of a general-purpose computer system according to aspects of the present invention.

FIG. 6 depicts one example aspect of a computer system 5 that can be used to implement the disclosed systems and methods for modifying a software distribution package. The computer system 5 may include, but not limited to, a personal computer, a notebook, tablet computer, a smart phone, a network server, a router, or other type of processing device. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the modules of computer system 5, such as during start-up. RAM 23 stores operating system 24 (OS), such as Windows® 7 Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a display 60 or other video reproduction device, such as touch-screen display. System 5 may also include an audio card 50 for reproducing sound via internal or external speakers 55. In addition, system 5 may include network card(s) 55, such as Ethernet, WiFi, GSM, Bluetooth or other wired, wireless, or cellular network interface for connecting computer system 5 to network 70, such as the Internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 6 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for creating an installation rule for automating installation of software applications on a plurality of computers, the method comprising:
   launching, by a processor, an application installer having a sequence of windows for installing a software application in an operating system of a computer;
   searching for and identifying, by an examination module, all active elements in an active window of the application installer;
   activating, by the examination module, each identified active element and tracking changes in status of all other active elements to identify the active elements that are control elements for transitioning the active window to a subsequent window in the sequence of windows of the application installer during installation of the software application in the operating system of the computer;
   activating, by the examination module, the identified control elements in the active window to transition to the subsequent window in the sequence of windows of the application installer;
   identifying, by the examination module, control elements in the subsequent window and in all other windows in the sequence of windows of the application installer to verify that activation of each identified control element transitions the sequence of windows to a final window in the sequence of windows during an installation of the software application in the operating system of the computer;
   generating an automatic installation rule for the software application that includes a series of commands to automatically activates control elements in each window in the sequence of windows of the application installer to install the software application in each operating system of the plurality of computers without a participation of a user;
   testing the generated automatic installation rule to verify that the software application is successfully installed without the participation of the user; and
   amending the generated automatic installation rule to generate a new automatic installation rule when the software application is not successfully installed without the participation of the user.

2. The method of claim 1, wherein an automatic installation rule includes a minimal series of commands for activating windows and control elements of said windows in order to install the software application on a user device without the participation of the user.

3. The method of claim 1, wherein the installation of the software application is verified to be successful upon occurrence of at least one of:
   change in an operating system registry indicating installation of the software application;
   appearance of the software application in the list of Add/Remove Programs;
   appearance of a software application icon on a desktop or in a quick start window;
   restarting of the computer on which the software application was installed;
   appearance of new services, drivers or plug-ins; and
   launching of processes from new executable files.

4. The method of claim 1, wherein launching the application installer includes launching the application installer in a real or virtual computer environment.

5. The method of claim 1, wherein the automatic installation rule is used to install a plurality of different software applications.

6. The method of claim 1, wherein an active UI element includes at least one of: Button, RadioButton, CheckBox, ComboBox, ListBox, Image, Label, TextBox, TabControl, Grid, and StackPanel.

7. A system for creating an installation rule for automating installation of software applications on a plurality of computers, the system comprising:
   a microprocessor configured to:
   launch an application installer having a sequence of windows for installing a software application in an operating system of a computer;
   search for and identify, by an examination module, all active elements in an active window of the application installer;
   activate, by the examination module, each identified active element and tracking changes in status of all other active elements to identify the active elements that are control elements for transitioning the active window to a subsequent window in the sequence of windows of the application installer during installation of the software application in the operating system of the computer;
   activate, by the examination module, the identified control elements in the active window to transition to the subsequent window in the sequence of windows of the application installer;
   identify, by the examination module, control elements in the subsequent window and in all other windows in the sequence of windows of the application installer to verify that activation of each identified control element transitions the sequence of windows to a final window in the sequence of windows during an installation of the software application in the operating system of the computer; and generate an automatic installation rule for the software application that includes a series of commands to automatically activate control elements in each window in the sequence of windows of the application installer to install the software application in each operating system of the plurality of computers without a participation of a user;

test the generated automatic installation rule to verify that the software application is successfully installed without the participation of the user;

amend the generated automatic installation rule to generate a new automatic installation rule when the software application is not successfully installed without the participation of the user.

8. The system of claim 7, wherein an automatic installation rule includes a minimal series of commands for activating windows and control elements of said windows in order to install the software application on a user device without the participation of the user.

9. The system of claim 7, wherein the installation of the software application is verified to be successful upon occurrence of at least one of:
change in an operating system registry indicating installation of the software application;
appearance of the software application in the list of Add/Remove Programs;
appearance of a software application icon on a desktop or in a quick start window;
restarting of the computer on which the software application was installed;
appearance of new services, drivers or plug-ins; and
launching of processes from new executable files.

10. The system of claim 7, wherein launching the application installer includes launching the application installer in a real or virtual computer environment.

11. The system of claim 7, wherein the automatic installation rule is used to install a plurality of different software applications.

12. The system of claim 7, wherein an active UI element includes at least one of: Button, RadioButton, CheckBox, ComboBox, ListBox, Image, Label, TextBox, TabControl, Grid, and StackPanel.

13. A computer program product comprising a non-transitory computer readable medium, for creating an installation rule for automating installation of software applications on a plurality of computers, wherein the computer program product includes computer executable instructions for:
launching an application installer having a sequence of windows for installing a software application in an operating system of a computer;
searching for and identifying, by an examination module, all active elements in an active window of the application installer;

activating, by the examination module, each identified active element and tracking changes in status of all other active elements to identify the active elements that are control elements for transitioning the active window to a subsequent window in the sequence of windows of the application installer during installation of the software application in the operating system of the computer;

activating, by the examination module, the identified control elements in the active window to transition to the subsequent window in the sequence of windows of the application installer;

identifying, by the examination module, control elements in the subsequent window and in all other windows in the sequence of windows of the application installer to verify that activation of each identified control element transitions the sequence of windows to a final window in the sequence of windows during an installation of the software application in the operating system of the computer;

generating an automatic installation rule for the software application that includes a series of commands to automatically activates control elements in each window in the sequence of windows of the application installer to install the software application in each operating system of the plurality of computers without a participation of a user;

testing the generated automatic installation rule to verify that the software application is successfully installed without the participation of the user; and amending the generated automatic installation rule to generate a new automatic installation rule when the software application is not successfully installed without the participation of the user.

14. The product of claim 13, wherein an automatic installation rule includes a minimal series of commands for activating windows and control elements of said windows in order to install the software application on a user device without the participation of the user.

15. The product of claim 13, wherein the installation of the software application is verified to be successful upon occurrence of at least one of:
change in an operating system registry indicating installation of the software application;
appearance of the software application in the list of Add/Remove Programs;
appearance of a software application icon on a desktop or in a quick start window;
restarting of the computer on which the software application was installed;
appearance of new services, drivers or plug-ins; and
launching of processes from new executable files.

16. The product of claim 13, wherein launching the application installer includes launching the application installer in a real or virtual computer environment.

17. The product of claim 13, wherein the automatic installation rule is used to install a plurality of different software applications.

* * * * *